United States Patent [19]

Fulwyler et al.

[11] 4,302,166
[45] Nov. 24, 1981

[54] DROPLET FORMING APPARATUS FOR USE IN PRODUCING UNIFORM PARTICLES

[75] Inventors: Mack J. Fulwyler; C. William Hatcher, both of Los Alamos, N. Mex.

[73] Assignee: Coulter Electronics, Inc., Hialeah, Fla.

[21] Appl. No.: 20,818

[22] Filed: Mar. 15, 1979

Related U.S. Application Data

[62] Division of Ser. No. 679,241, Apr. 22, 1976, Pat. No. 4,162,282.

[51] Int. Cl.³ .............................................. B01J 2/02
[52] U.S. Cl. ............................................ 425/6; 264/9
[58] Field of Search ..................... 425/6, 5; 264/9, 4

[56] References Cited

U.S. PATENT DOCUMENTS

| | | | |
|---|---|---|---|
| 2,911,672 | 11/1959 | Dorens et al. | 264/4 |
| 3,160,686 | 12/1964 | Doyle et al. | 264/4 |
| 3,423,489 | 1/1969 | Arens et al. | 264/4 |

Primary Examiner—Donald E. Czaja
Assistant Examiner—James R. Hall
Attorney, Agent, or Firm—Silverman, Cass & Singer, Ltd.

[57] ABSTRACT

Uniform particles are produced by introducing a laminar stream of a core liquid into a laminar flowing body of an immiscible sheath liquid. The core liquid or the sheath liquid, or both liquids, can contain one or more materials dispersed (dissolved or suspended) in them from which the uniform particles are formed. The two liquids and the dispersed material are expelled from a nozzle to form a liquid jet. The liquid jet is disturbed at a uniform, periodic rate to form liquid droplets which contain a uniform amount of the core liquid, the sheath liquid and the dispersed material. The droplets are collected and held in a catch liquid until the core and the sheath liquid in each droplet have diffused into the catch liquid leaving the uniform particles formed from the dispersed materials. There can be more than one sheath liquid which can also contain one or more materials dispersed in it.

5 Claims, 5 Drawing Figures

DROPLET FORMING APPARATUS FOR USE IN PRODUCING UNIFORM PARTICLES

This is a division, of application Ser. No. 679,241, filed Apr. 22, 1976 now U.S. Pat. No. 4,162,282.

BACKGROUND OF THE INVENTION

This invention concerns the production of uniform dimensioned particles, and more particularly, novel apparatus and methodology for producing uniform dimensioned spheres of minute sizes from various materials by forming uniform droplets containing uniform amounts of the materials and a uniform amount of a sheath liquid and a uniform amount of a core liquid immiscible with the sheath liquid.

Minute, spherical particles which are very uniform in volume and which can contain a uniform amount of an added material, such as a dye, have utility in many fields. For example, uniform plastic particles having known and controllable physical and optical properties are of great aid in developing instruments for use in biological cell analysis. The particles are highly useful also in the testing and calibration of such instruments. Particles of uranium oxide and plutonium oxide having uniform volume provide useful reactor fuel materials. Microspheres of radioactive materials that are uniform in size and volume are highly desirable for use in many biological and medical studies including those concerning deposition of various sizes of blood borne particles in the lungs, distribution of fetal blood flow, and distribution of cardiac output, for instance.

A uniform particle formed within a particle could be used in light scatter or other cell studies where a difference in the index of refraction between the cytoplasm and the nucleus is important. By forming a particle within a particle or a particle within a particle within a particle, very uniform pseudo-cells can be formed for calibrating and developing instruments used in these studies.

One system for producing uniform particles is shown in Fulwyler M. J., U.S. Pat. No. 3,790,492, issued Feb. 5, 1974. In this system, droplets of core liquid are formed in a laminar, flowing stream of sheath liquid. In utilizing this system it has been found that a small orifice, on the order of 20 microns in diameter, must be used to inject the core liquid into the moving stream of sheath liquid. Because of its small size, the nozzle used in this system is subject to plugging by the core liquid. Another limitation found in utilizing this system, is that the core liquid must be injected into the moving stream of sheath liquid essentially at the relatively low velocity of the sheath liquid to prevent the occurrence of turbulence. This results in a limited rate of droplet production on the order of 13,000 droplets per second. The size range of the diameters of the particles produced by this system is on the order of, but not limited to, 2 to 40 microns.

SUMMARY OF THE INVENTION

In practicing a preferred embodiment of the invention, a core liquid is introduced into a flowing body of an immiscible sheath liquid. Either or both liquids can have one or more materials dispersed in them. The liquids and the dispersed material are formed into a liquid jet. The liquid jet is periodically disturbed to form droplets containing a uniform amount of the core liquid, the sheath liquid, and the dispersed material. The droplets can be collected in a catch liquid which is stirred or agitated until a uniform particle is formed.

DESCRIPTION OF THE PREFERRED EMBODIMENTS

Figure 1:
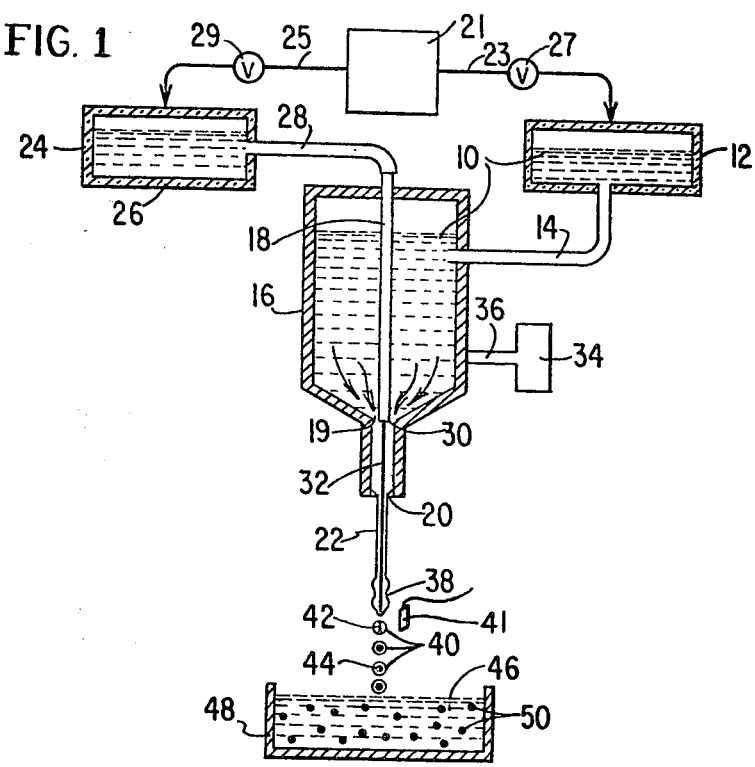
FIG. 1 is a diagrammatic view of a preferred embodiment of the invention with portions broken away to show details in a representative manner.

Referring to FIG. 1, a sheath liquid 10 is stored at a desired pressure in a first reservoir 12. The sheath liquid flows under pressure through a first conduit 14 into a flow chamber 16. The sheath liquid 10 flows around an injection tube 18 substantially centered in the flow chamber 16, becoming a laminar flowing body 19 and is expelled through a first nozzle 20 as a liquid jet 22. A core liquid 24, immiscible with the sheath liquid 10, is stored at a desired pressure in a second reservoir 26. The core liquid 24 flows under pressure through a second conduit 28 into the injection tube 18 which extends through one end of the flow chamber 16 to a point adjacent the lower end of the flow chamber. The core liquid 24 is expelled through a second nozzle 30 in the end of the injection tube 18 at the lower end of chamber 16 as a laminar stream 32 which is entrained in the liquid jet 22. As the core liquid 24 is immiscible in the sheath liquid 10, there exists a boundary surface between the two liquids.

The pressure supplied to the first and second reservoirs 12 and 26 can be supplied from any convenient source, as from a pressure source 21. The pressure can be developed by any well-known method. The pressure is supplied to the first reservoir 12 through a first conduit 23 and to the second reservoir 26 through a second conduit 25. The desired pressures in the respective reservoirs can be obtained by adjusting a first valve 27 in the first conduit 23 and a second valve 29 in the second conduit 25.

Either the core liquid 24 or the sheath liquid 10 or both of the liquids have one or more materials dispersed therein, either by solution or suspension. The operation of the preferred embodiment will be described first with the dispersed material only in the core liquid 24.

Figure 1A:
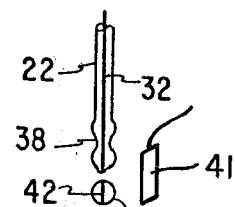
FIG. 1A is an enlarged view of the particle forming portion of FIG. 1.

A periodic disturbance is imparted to the liquid jet 22 to form droplets. The periodic disturbance can be generated by thermal modification of the surface tension of the liquid jet or by a vibration device 34 coupled to the chamber 16 by a rod 36. The vibration device 34 can be a suitable piezoelectric crystal device. To form uniform droplets, the periodic disturbance must be uniform and of a constant frequency. The frequency can be selected from several resonant frequencies determined by the velocity and diameter of the liquid jet 22. The periodic disturbance of the liquid jet 22 causes a disturbance, indicated diagrammatically at 38, in the liquid jet which causes the liquid jet 22 to separate into uniform droplets shown at 40. As the uniform droplets form, a uniform segment 42 of the core liquid laminar stream 32 is partitioned into each droplet (more clearly illustrated in FIG. 1A). A surface tension exists between the two fluids causing the segment 42 of core liquid to develop a minimum surface configuration. This minimum surface configuration will be a uniform sphere 44.

The uniform droplets 40 containing the uniform spheres 44 are received by a catch liquid 46 contained in a third reservoir 48. The uniform spheres 44 are shielded from the impact with the catch liquid 46 by the sheath liquid surrounding them. The catch liquid 46 is chosen such that the core liquid 24 is slightly soluble and will dissolve in it. The catch liquid 46 can be stirred or agitated in a conventional manner until the sheath liquid and the core liquid 24 of the uniform spheres 44 have dissolved in the catch liquid 46. When the core liquid 24 has dissolved uniform spherical solid particles 50 remain, which can be removed and concentrated in a conventional manner as by settling, filtering, centrifuging or otherwise.

The diameter of the particles 50 is dependent upon the concentration of the dispersed material in the core liquid 24, the volume of the core liquid 24 emerging in the stream 32, and the rate of the formation of the droplets 40.

Utilizing this embodiment of the invention, particles 50 can be formed having a diameter in the range of 1 to 100 microns. The particles 50 will have approximately a two percent variation in their diameters. The first and second nozzles 20 and 30 can have a diameter of 50 to 100 microns. The core liquid 24 can be stored at a pressure of 10 to 30 psi. The sheath liquid 10 can be stored at a pressure of 30 to 60 psi. This will produce flow rates of 0.5 to 1.0 ml/minute and 5 to 10 ml/minute respectively. The liquid jet 22 can be disturbed at a rate of 25 to 40 kilohertz which produces 25 to 40 thousand of the particles/second. The above ranges are the preferable ranges of this embodiment of the invention; however, the invention is not limited to the specific ranges enumerated.

Although the following two examples describe the production of uniform plastic particles, the invention is not limited to this application but can also be utilized to produce uniform particles of zirconium dioxide, clay, gelatin and other materials.

EXAMPLE I

The apparatus of FIG. 1 was used to produce the uniform particles 50 of polystyrene containing a fluorescent dye. The core liquid 24 was 25 percent dichloroethane and 75 percent dichloromethane. The dispersed (dissolved) materials in the core liquid were polystyrene (0.06 percent by weight/volume) and the fluorescent dye (0.0009 by weight/volume). The core liquid 24 containing the dissolved materials was placed in the reservoir 26 at a pressure of 20 psi. The sheath liquid 10 was an aqueous solution containing 3 percent by volume of a nonionic surfactant and 0.3 percent of a quaternary ammonium chloride biocide, and was placed in the reservoir 12 at a pressure 15 psi. At these pressures the flow of the core liquid 24 was approximately 0.6 ml/min and the flow of the sheath liquid 10 was 10 ml/min. Once the core and the sheath liquid were in a laminar flow through the first nozzle 20, the vibration device 34 was operated at a frequency of 32,200 hertz.

Figure 2:
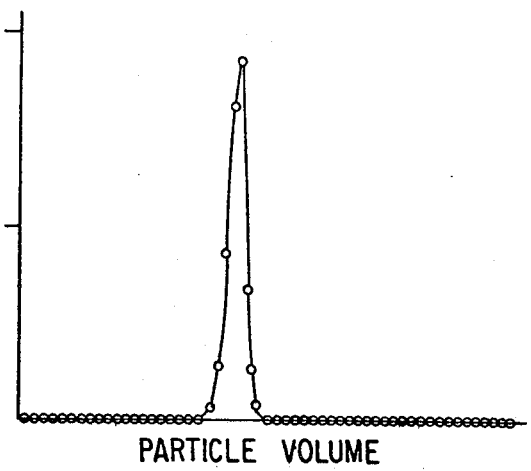
FIG. 2 is a chart illustrating the degree of uniformity of volume of representative particles produced by a preferred embodiment of the invention.
Figure 3:
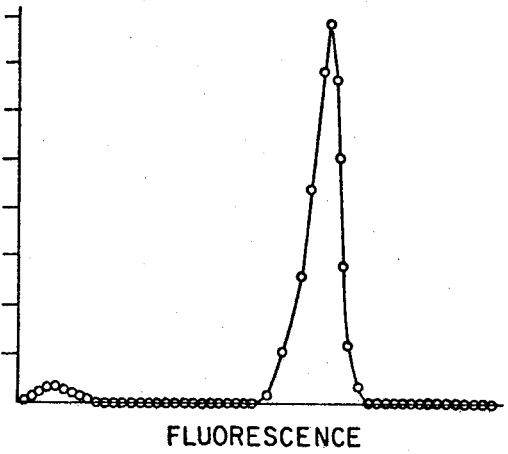
FIG. 3 is a chart illustrating the degree of uniformity of fluorescence of representative particles produced by a preferred embodiment of the invention.

The resulting droplets 40 were prevented from coalescing by applying a negative charge to each of the droplets 40 as they were formed. The charge was applied in a conventional manner as by an electrode 41. The resulting electrostatic repulsion maintains the separation of the droplets as they pass through the intervening air between the nozzle 20 and the catch liquid 46. The droplets 40 were collected in a beaker 48 containing the catch liquid 46 which was an aqueous solution of nonionic surfactant (4 percent by volume) and quaternary ammonium chloride biocide (0.8 percent by volume). The core liquid 24 diffused into the catch liquid 46, leaving the solid polystyrene microspheres 50. The microspheres 50 had diameters of 9.8 microns and a coefficient of variation in diameter of one percent which is shown in FIG. 2. The coefficient of variation in fluorescence intensity of the microspheres 50 was four percent as shown in FIG. 3.

EXAMPLE II

The apparatus of FIG. 1 was also used to produce the uniform particles 50 of polystyrene containing a blue dye. The core liquid 24 was 24 percent dichloroethane, 74.7 percent dichloromethane and 0.4 percent xylene. The dispersed (dissolved) materials in the core liquid were polystyrene (0.20 percent by weight/volume) and the blue dye (0.005 percent by weight/volume). The core liquid 24 containing the dissolved materials was placed in the reservoir 26 at a pressure of 44 psi. The sheath liquid 10 was an aqueous solution containing 0.63 percent by volume of nonionic surfactant and 0.25 percent by volume of a quaternary ammonium chloride biocide, and was placed in the reservoir 12 at a pressure of 32 psi. At these pressures the flow of the core liquid 24 was approximately 1.1 ml/min and the flow of the sheath liquid 10 was 6 ml/min. Once the core liquid 24 and the sheath liquid 10 were in a laminar flow through the first nozzle 20, the vibration device 34 was operated at a frequency of 35,000 hertz.

The resulting droplets 40 were prevented from coalescing and their volocity was dissipated by negatively charging them as they were formed. The droplets 40 were collected in a beaker 48 containing the catch liquid 46 which was an aqueous solution of nonionic surfactant (2.5 percent by volume) and quaternary ammonium chloride biocide (1.0 percent by volume). The core liquid 24 diffused into the catch liquid 46, leaving the solid polystyrene microspheres 50 containing the blue dye. The microspheres 50 had diameters of 13.8 micrometers and a coefficient of variation in diameter of 1.3 percent.

The manner of introducing the periodic disturbance to the liquid jet 22 is not limited to the vibration device 34. Alternatively, the vibrational energy could be directly coupled into the core liquid 24 or the sheath liquid 10. Also, the liquid jet 22 could be disturbed after it has been ejected from the nozzle 20 by vibrational, thermal or other energy.

It is a feature of the apparatus that each of the droplets 40 are extremely uniform in the volume of the core liquid 24 and in the volume of the sheath liquid 10 contained within it. However, it should be noted that the ratio of the volume of core liquid 24 to the volume of sheath liquid 10 contained in each droplet 40, can be varied in amount as desired.

The foregoing discussed forming the particles 50 from one or more suitable materials dispersed in the core liquid 24. However, by dispersing one or more suitable materials in the sheath liquid 10, the particles 50 can be formed from the sheath material, which also contain a droplet of the core liquid 24. In addition, a particle within a particle can be produced by dispersing one or more suitable materials in the sheath liquid 10 and the core liquid 24. By selecting suitable materials in suitable amounts and controlling the volume of core liquid 24 and sheath liquid 10 in each droplet 40, it may be feasible to produce particles with any desired index of refraction between the pseudocytoplasm and the nucleus of each particle. In the theory of this invention, the nucleus of the particle may be a liquid or a solid also, as desired.

Figure 4:
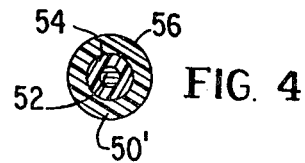
FIG. 4 is an enlarged sectional view of a particle within a particle within a particle.

As shown in FIG. 4, by utilizing a second sheath liquid outside the sheath liquid 10, a particle 52 within a particle 54 within a particle 56 can be feasible. A particle 50' is shown in section, with the inner particle 52 formed from the core liquid; the particle 54 formed from a material or materials dispersed in the sheath liquid 10; and the particle 56 formed from a material or materials dispersed in the second sheath liquid. Either of the two inner particles 52, 54 may be formed from a liquid or they can both be solid particles formed from materials dispersed in the liquids. By selecting suitable materials and dyes in proper amounts, the index of refraction between each of the particles 52, 54, 56 can be varied as well as the respective volumes of each particle. Applicants have not produced such complex particles, but believe that it may be feasible to do within the concept of their invention as set forth herein.

Many modifications and variations of the present invention are possible in light of the above teachings. It is, therefore, to be understood that within the scope of the appended claims the invention may be practiced otherwise than as specifically described.

What is claimed and desired to be secured by Letters Patent of the United States is:

1. A droplet forming apparatus for producing uniformly sized solid particles from dispersed material in at least one of a core and sheath liquids which are immiscible with each other and supplied to the apparatus from a source of said liquids, said apparatus comprising:

means for connecting the source of core liquid to the apparatus;

means for connecting the source of sheath liquid to the apparatus;

means for forming a moving body of at least one sheath liquid for laminar movement through the apparatus;

means for introducing said core liquid as a laminar stream into said moving body at a selected location along the path of movement of the moving body through the apparatus;

means for producing a liquid jet from said moving body after said introduction of said core liquid;

disturbance means for periodically disturbing said liquid jet to separate said liquid jet including said core and said sheath liquids into unconnected uniform droplets containing a uniform amount of said disbursed material, said core liquid and said sheath liquid; and means to collect said formed droplets in a catch liquid in which said sheath liquid and said core liquid are each soluble, whereby said sheath liquid and said core liquid are dissolved therein to render the material dispersed in said core liquid into said uniformly sized solid particles.

2. An apparatus according to claim 1 wherein said disturbance means includes:

means for uniformly and periodically disturbing said liquid jet at a constant rate in a transverse direction thereto.

3. An apparatus according to claim 1 wherein said means for introducing includes:

means for introducing said core liquid substantially into the center of said moving body of sheath liquid.

4. An apparatus according to claim 1 wherein said means for introducing includes:

means for introducing said core liquid substantially coaxial with the axis of said moving body of sheath liquid.

5. An apparatus according to claim 1 further including:

charging means for applying like-repelling charges to each of said uniform droplets.

* * * * *